(12) United States Patent
Wang et al.

(10) Patent No.: US 11,743,605 B2
(45) Date of Patent: Aug. 29, 2023

(54) IMAGE SENSOR, MOBILE TERMINAL, AND IMAGE PHOTOGRAPHING METHOD

(71) Applicant: VIVO MOBILE COMMUNICATION CO., LTD., Guangdong (CN)

(72) Inventors: Danmei Wang, Guangdong (CN); Huazhao Zhou, Guangdong (CN); Panpan Zhu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 333 days.

(21) Appl. No.: 17/151,927

(22) Filed: Jan. 19, 2021

(65) Prior Publication Data
US 2022/0368866 A1 Nov. 17, 2022

Related U.S. Application Data

(63) Continuation of application No. PCT/CN2019/096128, filed on Jul. 16, 2019.

(30) Foreign Application Priority Data

Jul. 19, 2018 (CN) .......................... 201810797355.6

(51) Int. Cl.
*H04N 25/131* (2023.01)
*H04N 23/53* (2023.01)
(Continued)

(52) U.S. Cl.
CPC ........... *H04N 25/131* (2023.01); *H04N 23/53* (2023.01); *H04N 23/55* (2023.01); *H04N 23/56* (2023.01)

(58) Field of Classification Search
CPC ...... H04N 25/131; H04N 23/53; H04N 23/55; H04N 23/56; H04N 25/704; H04N 23/54; H04N 23/10
See application file for complete search history.

(56) References Cited

U.S. PATENT DOCUMENTS 4,621,292 A * 11/1986 Hirao ....................... G02B 7/32
396/106
9,313,376 B1 * 4/2016 Bertolami .......... H04N 1/00161
(Continued)

FOREIGN PATENT DOCUMENTS

CN 101621697 A 11/2010
CN 105049829 A 11/2015
(Continued)

OTHER PUBLICATIONS

European Search Report received for PCT/CN2019/096128, dated May 3, 2021, 7 pages.
(Continued)

*Primary Examiner* — Michael E Teitelbaum
(74) *Attorney, Agent, or Firm* — BROOKS KUSHMAN P.C.

(57) ABSTRACT

An image sensor, a mobile terminal, and an image photographing method are provided. A pixel array of the image sensor includes a preset quantity of pixel units. The pixel unit includes a first full-pixel dual-core focus pixel and a second full-pixel dual-core focus pixel. The first pixel includes a red sub-pixel, a green sub-pixel, and a blue sub-pixel. The second pixel includes at least one of a red sub-pixel or a blue sub-pixel, a green sub-pixel, and an infrared sub-pixel.

10 Claims, 9 Drawing Sheets

(51) Int. Cl.
  *H04N 23/55*  (2023.01)
  *H04N 23/56*  (2023.01)

(56) References Cited

U.S. PATENT DOCUMENTS

| | | | |
|---|---|---|---|
| 2015/0181187 A1* | 6/2015 | Wu | H01L 27/14621 |
| | | | 348/336 |
| 2016/0161332 A1 | 6/2016 | Townsend | |
| 2016/0248967 A1 | 8/2016 | Sasaki | |
| 2016/0277658 A1 | 9/2016 | Kim et al. | |
| 2018/0124334 A1* | 5/2018 | Li | H04N 25/70 |
| 2018/0316845 A1* | 11/2018 | Ouyang | H01L 27/14645 |
| 2018/0350860 A1 | 12/2018 | Mao et al. | |
| 2020/0059592 A1 | 2/2020 | Zeng | |
| 2020/0059604 A1 | 2/2020 | Zeng | |

FOREIGN PATENT DOCUMENTS

| | | |
|---|---|---|
| CN | 205430494 U | 8/2016 |
| CN | 106878690 A | 6/2017 |
| CN | 106921823 A | 7/2017 |
| CN | 106973206 A | 7/2017 |
| CN | 106973233 A | 7/2017 |
| CN | 106982328 A | 7/2017 |
| CN | 107040724 A | 8/2017 |
| CN | 107105140 A | 8/2017 |
| CN | 107146797 A | 9/2017 |
| CN | 207354459 U | 5/2018 |
| CN | 108271012 A | 7/2018 |
| CN | 108600712 A | 9/2018 |
| CN | 105611136 A | 4/2019 |
| CN | 107124536 A | 5/2020 |
| CN | 106982329 A | 8/2020 |
| EP | 2924978 A1 | 9/2015 |
| WO | 2017171412 A2 | 8/2018 |

OTHER PUBLICATIONS

First Office Action report received from China Application No. 201810797355.6, dated May 28, 2019, 11 pages and 9 pages of translation.

Second Office Action report received from China Application No. 201810797355.6, dated Nov. 19, 2019, 7 pages and 11 pages of translation.

Written opinion and International Search Report received for PCT/CN2019/096128, dated Jan. 28, 2021, 9 pages and 6 pages of translation.

* cited by examiner

| R | R | G | G | R | R | G | G |
|---|---|---|---|---|---|---|---|
| G | G | B | B | G | G | B | B |
| R | R | G | G | IR | IR | G | G |
| G | G | B | B | G | G | B | B |

FIG. 2a

| R | R | G | G | R | R | G | G |
|---|---|---|---|---|---|---|---|
| G | G | IR | IR | G | G | B | B |
| R | R | G | G | R | R | G | G |
| G | G | B | B | G | G | B | B |

FIG. 2b

| R | R | G | G | R | R | G | G |
|---|---|---|---|---|---|---|---|
| G | G | B | B | G | G | B | B |
| R | R | IR | IR | R | R | G | G |
| G | G | B | B | G | G | B | B |

FIG. 2c

| R | R | G | G | R | R | G | G |
|---|---|---|---|---|---|---|---|
| G | IR | IR | B | G | G | B | B |
| R | R | G | G | R | R | G | G |
| G | G | B | B | G | G | B | B |

FIG. 3a

| R | R | G | G | R | R | G | G |
|---|---|---|---|---|---|---|---|
| G | G | B | IR | IR | G | B | B |
| R | R | G | G | R | R | G | G |
| G | G | B | B | G | G | B | B |

FIG. 3b

| R | R | G | G | R | R | G | G |
|---|---|---|---|---|---|---|---|
| G | G | B | B | G | G | B | B |
| R | IR | IR | G | R | R | G | G |
| G | G | B | B | G | G | B | B |

FIG. 4a

| R | R | G | G | R | R | G | G |
|---|---|---|---|---|---|---|---|
| G | G | B | B | G | G | B | B |
| R | R | G | IR | IR | R | G | G |
| G | G | B | B | G | G | B | B |

FIG. 4b

| R | R | G | G | R | R | G | G |
|---|---|---|---|---|---|---|---|
| G | G | B | B | G | G | IR | IR |

FIG. 5a

| R | R | G | G | IR | IR | G | G | R | R | G | G |
|---|---|---|---|----|----|---|---|---|---|---|---|
| G | G | B | B | G  | G  | B | B | G | G | B | B |

FIG. 5b

| R | R | G | G | R | R | G | G |
|---|---|---|---|---|---|---|---|
| G | G | B | IR | IR | G | B | B |

FIG. 6a

| R | R | G | IR | IR | R | G | G | R | R | G | G |
|---|---|---|----|----|---|---|---|---|---|---|---|
| G | G | B | B  | G  | G | B | B | G | G | B | B |

IMAGE SENSOR, MOBILE TERMINAL, AND IMAGE PHOTOGRAPHING METHOD

CROSS-REFERENCE TO RELATED APPLICATIONS

This application is a continuation application of PCT Application No. PCT/CN2019/096128 filed on Jul. 16, 2019, which claims priority to Chinese Patent Application No. 201810797355.6, filed in China on Jul. 19, 2018, which is incorporated herein by reference in its entirety.

TECHNICAL FIELD

This disclosure relates to the field of image processing technologies, and in particular, to an image sensor, a mobile terminal, and an image photographing method.

BACKGROUND

Currently, intelligent electronic products have gradually become necessities of people's life. As an important configuration of an electronic product, a photographing function is also gradually developing. However, as the photographing function is promoted and gains popularity, people are no longer satisfied with a camera having only photographing function in current intelligent electronic products, but more expect diverse photographing effects, diverse playing methods, and diverse functions.

Figure 1A:
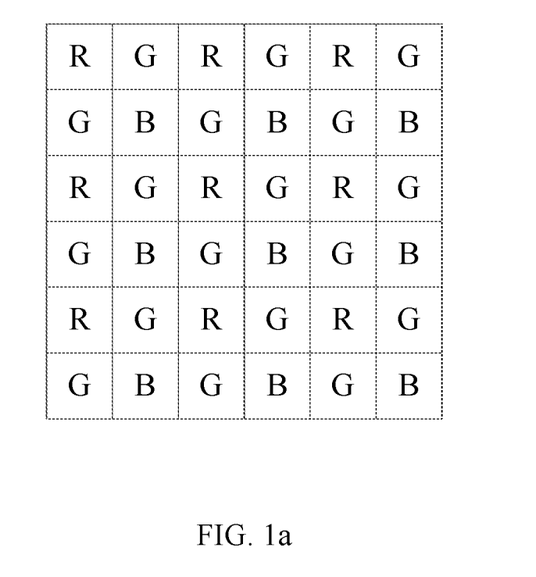
FIG. 1a is a schematic diagram of a conventional RGB arrangement in a related technology.
Figure 1B:
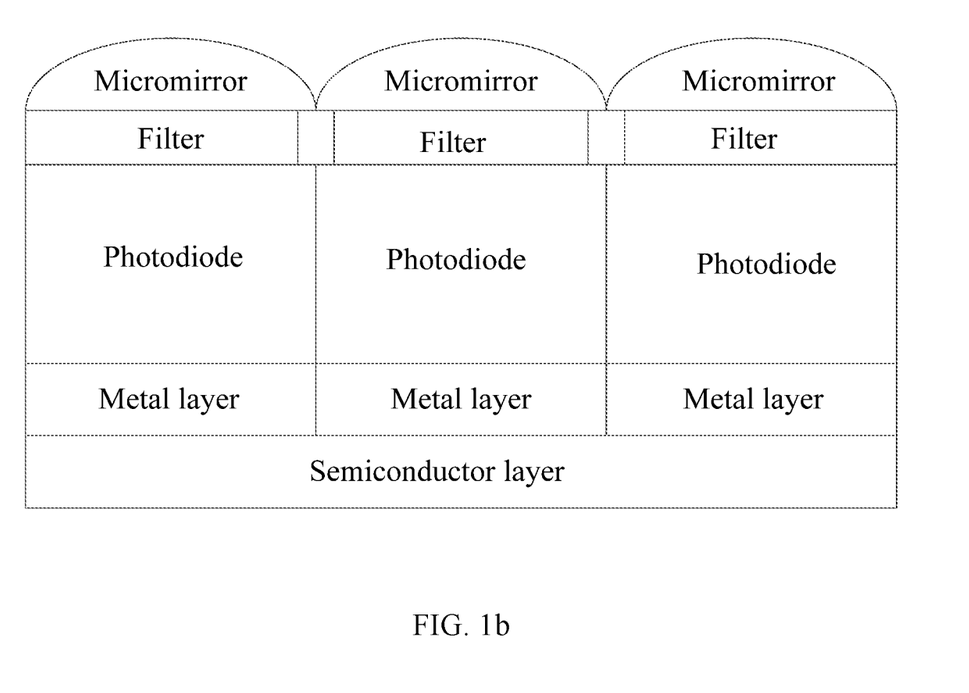
FIG. 1b is a sectional view of conventional pixels.

Currently, on the market, an R (red)-G (green)-B (blue) Bayer pixel array arrangement mode is most commonly used in a pixel array arrangement of an image sensor based on a complementary metal oxide semiconductor (CMOS), as shown in FIG. 1a and FIG. 1B. However, this arrangement manner cannot be used to detect an object distance, and can be used only to receive natural light, and record an image through photographing in normal light.

Figure 1C:
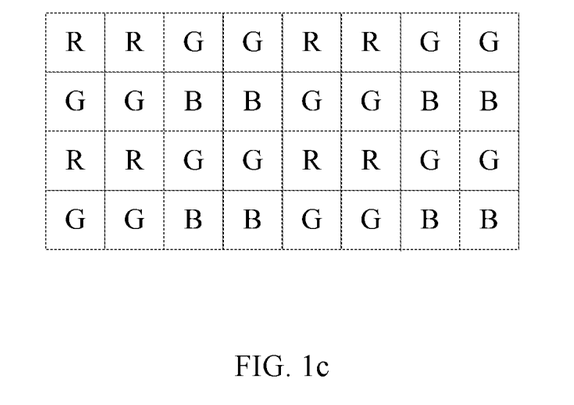
FIG. 1c is an arrangement diagram of a 2PD pixel array.
Figure 1D:
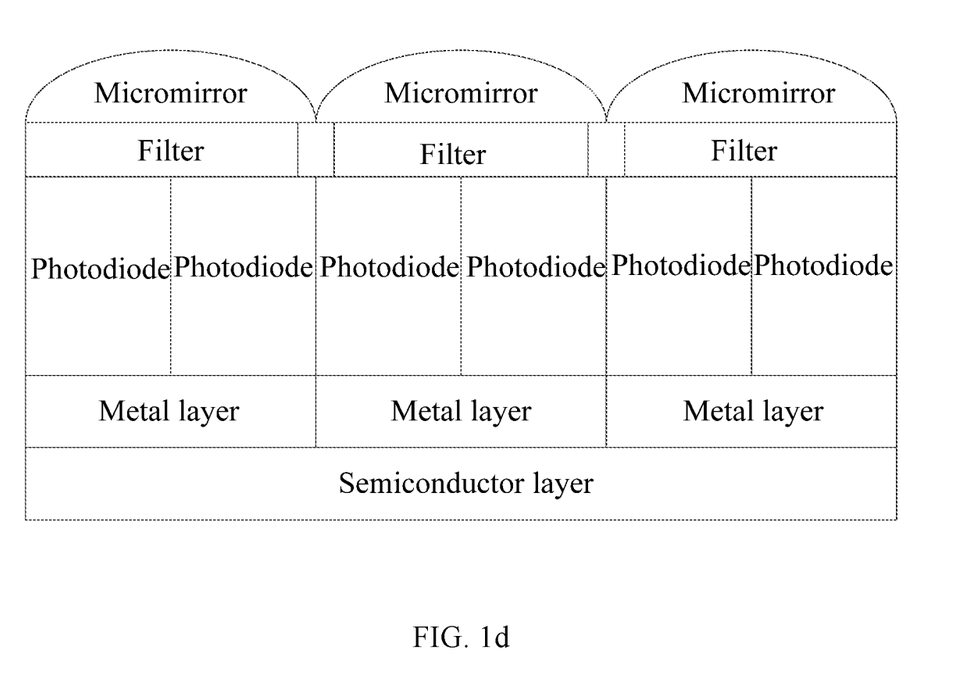
FIG. 1d is a sectional view of 2PD pixels.
Figure 2A:
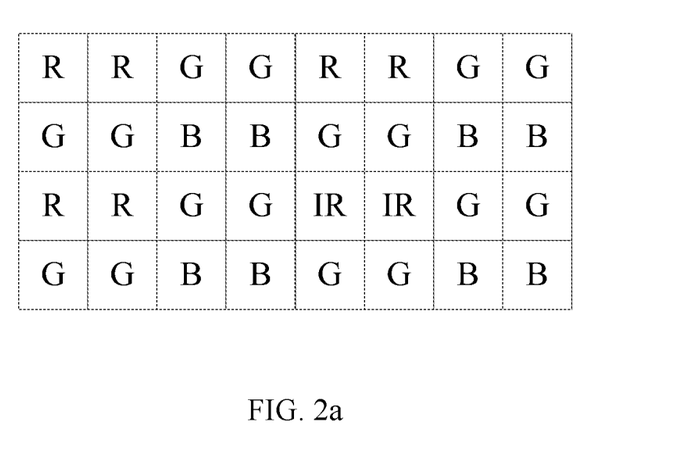
FIG. 2a is a schematic diagram 1 of a pixel unit according to some embodiments of this disclosure.
Figure 2B:
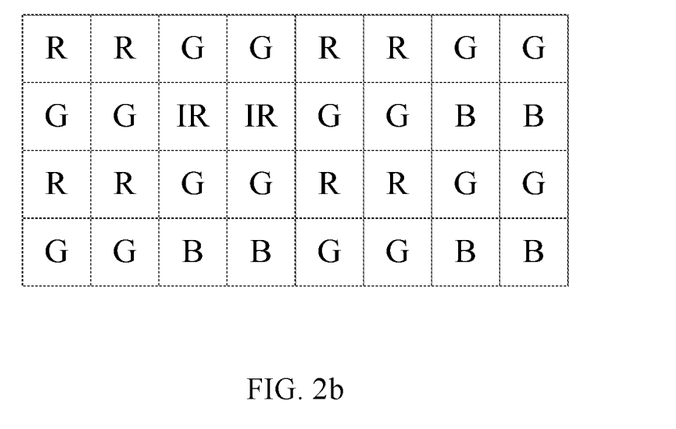
FIG. 2b is a schematic diagram 2 of a pixel unit according to some embodiments of this disclosure.
Figure 2C:
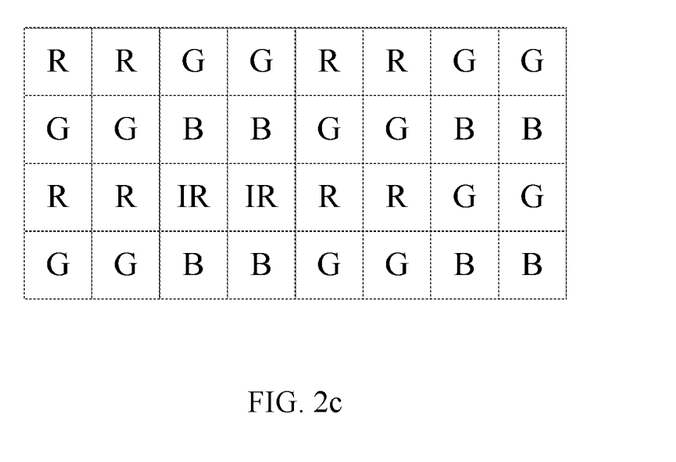
FIG. 2c is a schematic diagram 3 of a pixel unit according to some embodiments of this disclosure.

A pixel array arrangement mode of a full-pixel dual-core focus (2PD) technology is shown in FIG. 1c and FIG. 1d. Likewise, this arrangement manner can be used only to receive natural light, and record an image through photographing.

However, compared with a solution of a phase detection auto focus (PDAF) technology, the 2PD technology can be used to additionally detect an object distance, to perform a focusing action more quickly.

A principle of the 2PD phase detection technology is described as follows: It can be learned from FIG. 1c and FIG. 1d that, some R, G, and B sub-pixels in a pixel array each are divided into two parts, and different photon energy is obtained based on different incident directions, so that a sub-pixel on the left and a sub-pixel on the right form a phase detection pair. When a luminance value of the sub-pixel on the left and a luminance value of the sub-pixel on the right both reach relative maximum peaks, an image is comparatively clearest, which is in-focus. Then an object distance is calculated by using an algorithm, to implement quick focus.

To sum up, in the pixel array arrangement of the image sensor based on the CMOS, an object distance cannot be detected, and only natural light can be received; and in the pixel array arrangement of the 2PD technology, although an object distance can be detected, only natural light can be received. Therefore, in the pixel array arrangement modes of the image sensor in the related technologies, photographing scenes are limited, and focusing is slow, thereby affecting photographing experience of a user.

SUMMARY

According to a first aspect, some embodiments of this disclosure provide an image sensor, including:

a pixel array, where the pixel array includes a preset quantity of pixel units arranged in a preset manner, the pixel unit includes a first pixel and a second pixel whose location is adjacent to that of the first pixel, the first pixel includes a red sub-pixel, a green sub-pixel, and a blue sub-pixel, and the second pixel includes at least one of a red sub-pixel or a blue sub-pixel, a green sub-pixel, and an infrared sub-pixel, where the first pixel and the second pixel are both full-pixel dual-core focus pixels, and the first pixel and the second pixel each includes four full-pixel dual-core focus sub-pixels; and a location of the infrared sub-pixel in the second pixel is the same as that of the red sub-pixel, the green sub-pixel, the blue sub-pixel, a first combined sub-pixel, or a second combined sub-pixel in the first pixel, where the first combined sub-pixel is a combination of a ½ red sub-pixel and a ½ green sub-pixel whose locations are adjacent, and the second combined sub-pixel is a combination of a ½ green sub-pixel and a ½ blue sub-pixel whose locations are adjacent; or a location of a ½ infrared sub-pixel in the second pixel is the same as that of a ½ red sub-pixel, a ½ green sub-pixel, or a ½ blue sub-pixel in the first pixel, and ½ infrared sub-pixels in two adjacent second pixels are combined to form the complete infrared sub-pixel.

According to a second aspect, some embodiments of this disclosure provide a mobile terminal, including an imaging system and an infrared emission module, where the imaging system includes the foregoing image sensor, and further includes:

a lens module;

a drive module configured to drive the lens module to move;

a filter module disposed between the lens module and the image sensor;

an image data processing module connected to the image sensor; and a display module connected to the image data processing module, where the infrared emission module is disposed on a periphery of the lens module.

According to a third aspect, some embodiments of this disclosure provide an image photographing method applied to a mobile terminal, where the mobile terminal includes the foregoing image sensor, and further includes an infrared emission module, and the method includes:

emitting infrared light by using the infrared emission module;

obtaining a distance between each infrared light reflection point on a to-be-photographed object and the mobile terminal based on infrared light reflected by the to-be-photographed object; and obtaining three-dimensional information of the to-be-photographed object based on the distance between each infrared light reflection point on the to-be-photographed object and the mobile terminal.

BRIEF DESCRIPTION OF DRAWINGS

To describe the technical solutions in some embodiments of this disclosure more clearly, the following briefly describes the accompanying drawings required for describing some embodiments of this disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

The following clearly and comprehensively describes the technical solutions in some embodiments of this disclosure with reference to the accompanying drawings of the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

Some embodiments of this disclosure provide an image sensor, including a pixel array, where the pixel array includes a preset quantity of pixel units arranged in a preset manner. As shown in FIG. 2a to FIG. 2c, FIG. 3a, FIG. 3b, FIG. 4a, and FIG. 4b, the pixel unit includes a first pixel and a second pixel whose location is adjacent to that of the first pixel, the first pixel includes a red sub-pixel, a green sub-pixel, and a blue sub-pixel, and the second pixel includes at least one of a red sub-pixel or a blue sub-pixel, a green sub-pixel, and an infrared sub-pixel, where the first pixel and the second pixel are both full-pixel dual-core focus pixels, and the first pixel and the second pixel each includes four full-pixel dual-core focus sub-pixels.

A location of the infrared sub-pixel in the second pixel is the same as that of the red sub-pixel, the green sub-pixel, the blue sub-pixel, a first combined sub-pixel, or a second combined sub-pixel in the first pixel, where the first combined sub-pixel is a combination of a ½ red sub-pixel and a ½ green sub-pixel whose locations are adjacent, and the second combined sub-pixel is a combination of a ½ green sub-pixel and a ½ blue sub-pixel whose locations are adjacent.

Alternatively, a location of a ½ infrared sub-pixel in the second pixel is the same as that of a ½ red sub-pixel, a ½ green sub-pixel, or a ½ blue sub-pixel in the first pixel, and ½ infrared sub-pixels in two adjacent second pixels are combined to form a complete infrared sub-pixel.

The pixel array included in the image sensor provided in some embodiments of this disclosure includes the preset quantity of pixel units, where the preset quantity of pixel units are arranged in a preset manner. The preset quantity of pixel units each includes a first pixel and a second pixel. The first pixel is different from the second pixel. The first pixel includes a red (R) sub-pixel, a green (G) sub-pixel, and a blue (B) sub-pixel. The second pixel includes at least one of a red sub-pixel or a blue sub-pixel, and further includes a green sub-pixel and an infrared (IR) sub-pixel. By setting the infrared sub-pixel in the second pixel, an image may be photographed when infrared light is received, to implement dark-state imaging and ensure photographing experience of a user.

In some embodiments of this disclosure, the first pixel and the second pixel are both full-pixel dual-core focus (2PD) pixels. The 2PD pixels may be used to detect an object distance, to perform a focusing action more quickly. Herein, that the first pixel and the second pixel are both 2PD pixels means that sub-pixels in the first pixel and the second pixel are all 2PD sub-pixels.

The red sub-pixel, the green sub-pixel, and blue sub-pixel in the first pixel are arranged in a specific manner, and the first pixel includes four full-pixel dual-core focus sub-pixels: one red sub-pixel, and one blue sub-pixel, and two green sub-pixels. Herein, for ease of differentiation, the two green sub-pixels are referred to as a first green sub-pixel and a second green sub-pixel, and the first green sub-pixel is the same as the second green sub-pixel. The red sub-pixel is adjacent to the first green sub-pixel, the second green sub-pixel is located below the red sub-pixel, the blue sub-pixel is located below the first green sub-pixel, and the second green sub-pixel is adjacent to the blue sub-pixel.

The second pixel includes four full-pixel dual-core focus sub-pixels, specifically, including the at least one of the red sub-pixel or the blue sub-pixel, and further including the green sub-pixel and the infrared sub-pixel. To be specific, the second pixel may include the red sub-pixel, the green sub-pixel, and the infrared sub-pixel; may include the green sub-pixel, the blue sub-pixel, and the infrared sub-pixel; or may include the green sub-pixel, the red sub-pixel, the blue sub-pixel, and the infrared sub-pixel.

A location of the infrared sub-pixel in the second pixel may be the same as that of a specific sub-pixel in the first pixel, or may be the same as those of two different ½ sub-pixels that are adjacent in the first pixel. Certainly, alternatively, a location of a ½ infrared sub-pixel in the second pixel is the same as that of any ½ sub-pixel in the first pixel. In this case, ½ infrared sub-pixels in two adjacent second pixels may be combined to form the complete infrared sub-pixel. For example, a location of a ½ infrared sub-pixel in the second pixel is the same as that of a ½ red sub-pixel in the first pixel, and a location of the other ½ infrared sub-pixel in the second pixel is the same as that of a ½ green sub-pixel in the first pixel, so that two second pixels may be combined to form a complete infrared sub-pixel.

In some embodiments of this disclosure, an RGB pixel array arrangement manner is changed from the RGB pixel array arrangement manner to an RGB-IR (infrared) pixel array arrangement manner, so that the mobile terminal can take an image through photographing when receiving infrared light, to implement dark-state imaging and ensure photographing experience of a user.

In addition, the image sensor in some embodiments of this disclosure can detect a distance between a to-be-photographed object and the mobile terminal, to implement quick focus and background blurring. Through cooperation with an infrared emission module, an imaging effect of an image can be improved, and related application functions of three-dimensional photographing can be implemented, thereby ensuring diverse functions of the mobile terminal while ensuring photographing experience of a user.

In some embodiments of this disclosure, as shown in FIG. 2a to FIG. 2c, FIG. 3a, and FIG. 4a, a location of the infrared sub-pixel in the second pixel is the same as that of the red sub-pixel, the green sub-pixel, the blue sub-pixel, a first combined sub-pixel, or a second combined sub-pixel in the first pixel, the first combined sub-pixel is a combination of a ½ red sub-pixel and a ½ green sub-pixel whose locations are adjacent, and the second combined sub-pixel is a combination of a ½ green sub-pixel and a ½ blue sub-pixel whose locations are adjacent.

When the second pixel includes the blue sub-pixel, the green sub-pixel, and the infrared sub-pixel, the infrared sub-pixel replaces the red sub-pixel in the first pixel. In this case, the location of the infrared sub-pixel in the second pixel is the same as that of the red sub-pixel in the first pixel.

When the second pixel includes the red sub-pixel, the green sub-pixel, and the infrared sub-pixel, the infrared sub-pixel replaces the blue sub-pixel in the first pixel. In this case, the location of the infrared sub-pixel in the second pixel is the same as that of the blue sub-pixel in the first pixel.

When the second pixel includes the red sub-pixel, the green sub-pixel, the blue sub-pixel, and the infrared sub-pixel, the infrared sub-pixel may replace the green sub-pixel in the first pixel. In this case, the location of the infrared sub-pixel in the second pixel is the same as that of the green sub-pixel in the first pixel.

When the second pixel includes the red sub-pixel, the green sub-pixel, the blue sub-pixel, and the infrared sub-pixel, the second pixel may alternatively include one red sub-pixel, one green sub-pixel, a ½ blue sub-pixel, a ½ green sub-pixel, and one infrared sub-pixel. In this case, the infrared sub-pixel replaces a ½ green sub-pixel and a ½ blue sub-pixel in the first pixel, that is, the location of the infrared sub-pixel in the second pixel is the same as those of the ½ green sub-pixel and the ½ blue sub-pixel that are adjacent in the first pixel.

When the second pixel includes the red sub-pixel, the green sub-pixel, the blue sub-pixel, and the infrared sub-pixel, the second pixel may alternatively include one blue sub-pixel, one green sub-pixel, a ½ red sub-pixel, a ½ green sub-pixel, and one infrared sub-pixel. In this case, the infrared sub-pixel replaces a ½ green sub-pixel and a ½ red sub-pixel in the first pixel, that is, the location of the infrared sub-pixel in the second pixel is the same as those of a ½ green sub-pixel and a ½ red sub-pixel that are adjacent in the first pixel.

In some embodiments of this disclosure, when the location of the infrared sub-pixel in the second pixel is the same as that of the red sub-pixel, the green sub-pixel, the blue sub-pixel, the first combined sub-pixel, or the second combined sub-pixel in first pixel, the pixel unit includes one second pixel and at least one first pixel.

Figure 5A:
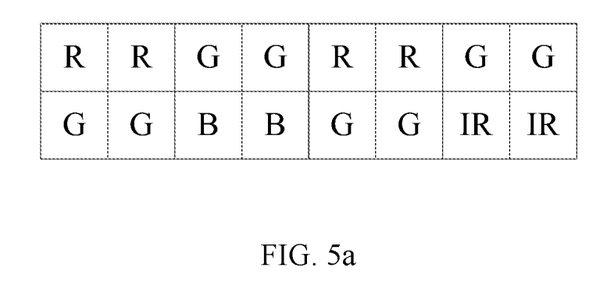
FIG. 5a is a schematic diagram 8 of a pixel unit according to some embodiments of this disclosure.

If the location of the infrared sub-pixel in the second pixel is the same as that of the red sub-pixel, the green sub-pixel, the blue sub-pixel, the first combined sub-pixel, or the second combined sub-pixel in the first pixel, in the pixel unit, a quantity of second pixels is 1, and a quantity of first pixels may be greater than or equal to 1. When the pixel unit includes one second pixel and one first pixel, a pixel sampling density of infrared sub-pixels in the pixel unit is ⅛. For example, as shown in FIG. 5a, the pixel unit includes one first pixel and one second pixel, the second pixel includes one red sub-pixel, two green sub-pixels, and one infrared sub-pixel, and the first pixel includes one red sub-pixel, two green sub-pixels, and one blue sub-pixel. In this case, a proportion of the infrared sub-pixels in the pixel unit is ⅛, in other words, a pixel sampling density of the infrared sub-pixels is ⅛.

Figure 5B:
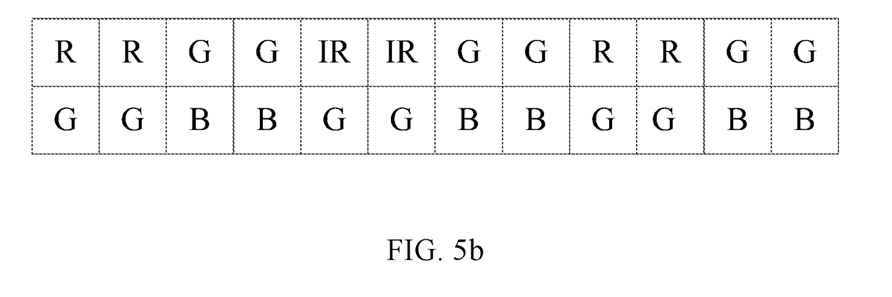
FIG. 5b is a schematic diagram 9 of a pixel unit according to some embodiments of this disclosure.

When the pixel unit includes two first pixels and one second pixel, a density of infrared sub-pixels in the pixel unit is 1/12. For example, as shown in FIG. 5b, the pixel unit includes two first pixels and one second pixel. The second pixel includes one blue sub-pixel, two green sub-pixels, and one infrared sub-pixel, and the first pixel includes one red sub-pixel, two green sub-pixels, and one blue sub-pixel. In this case, a proportion of the infrared sub-pixels in the pixel unit is 1/12, in other words, a pixel sampling density of the infrared sub-pixels is 1/12.

Figure 4A:
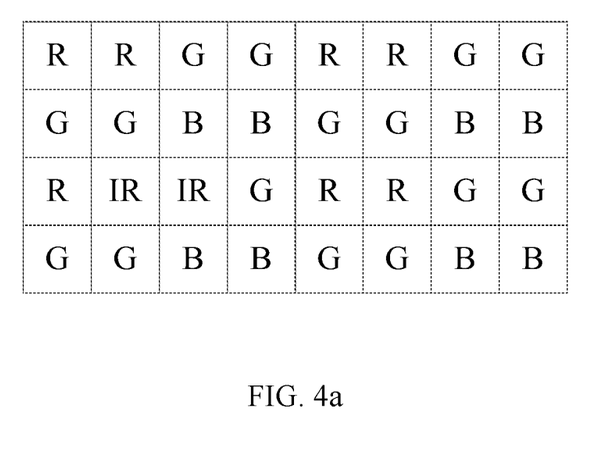
FIG. 4a is a schematic diagram 6 of a pixel unit according to some embodiments of this disclosure.

When the pixel unit includes three first pixels and one second pixel, a density of infrared sub-pixels in the pixel unit is 1/16. For example, as shown in FIG. 4a, the pixel unit includes three first pixels and one second pixel, the second pixel includes one blue sub-pixel, one green sub-pixel, a ½ red sub-pixel, a ½ green sub-pixel, and one infrared sub-pixel, the ½ red sub-pixel and the ½ green sub-pixel of 2PD sub-pixels may be taken based on the first pixel to form an infrared pixel, and the first pixel includes one red sub-pixel, two green sub-pixels, and one blue sub-pixel. In this case, a proportion of the infrared sub-pixels in the pixel unit is 1/16, in other words, a pixel sampling density of the infrared sub-pixels is 1/16.

The foregoing corresponding pixel sampling methods are only used as examples for description, and there may be other points-taking methods. Details are not described herein. A density of infrared sub-pixels in a pixel unit is ¼n, n is an integer greater than or equal to 2, and a size of a pixel array applicable to the infrared sub-pixels is not limited.

Figure 3A:
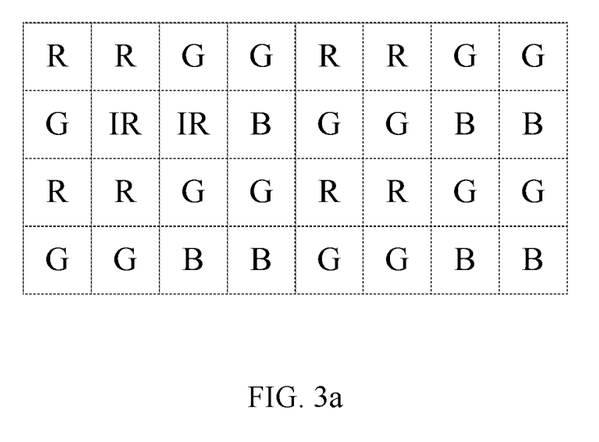
FIG. 3a is a schematic diagram 4 of a pixel unit according to some embodiments of this disclosure.
Figure 3B:
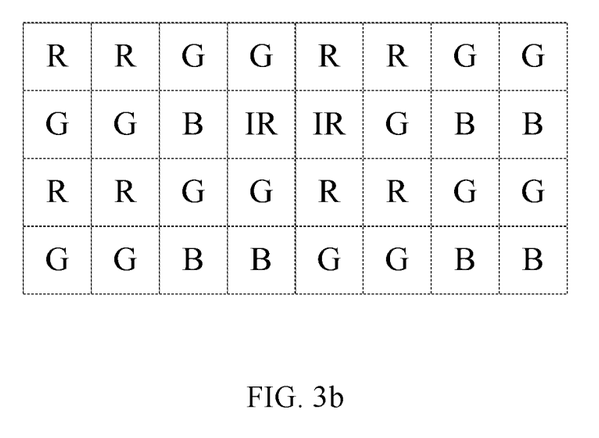
FIG. 3b is a schematic diagram 5 of a pixel unit according to some embodiments of this disclosure.
Figure 4B:
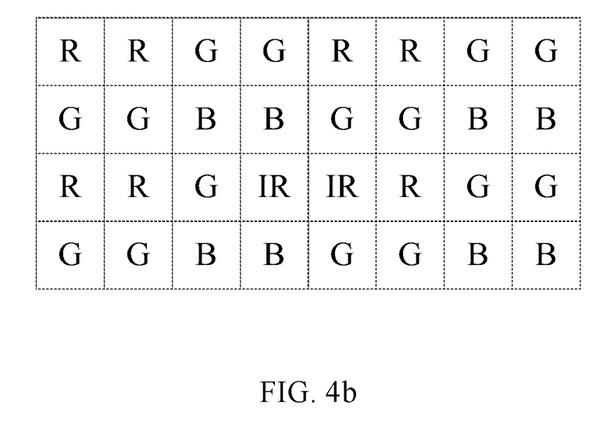
FIG. 4b is a schematic diagram 7 of a pixel unit according to some embodiments of this disclosure.

In some embodiments of this disclosure, as shown in FIG. 3b and FIG. 4b, a location of a ½ infrared sub-pixel in the second pixel is the same as that of a ½ red sub-pixel, a ½ green sub-pixel, or a ½ blue sub-pixel in the first pixel, and ½ infrared sub-pixels in two adjacent second pixels are combined to form a complete infrared sub-pixel.

When the location of the ½ infrared sub-pixel in the second pixel is the same as that of the ½ red sub-pixel, the ½ green sub-pixel, or the ½ blue sub-pixel in the first pixel, and the ½ infrared sub-pixels in the two adjacent second pixels are combined to form the complete infrared sub-pixel, in the pixel unit, a quantity of second pixels is 2, and a quantity of first pixels is greater than or equal to 0.

The second pixel may include only the ½ infrared sub-pixel. In this case, two adjacent second pixels may be combined to obtain the complete infrared sub-pixel.

When the second pixel includes the ½ infrared sub-pixel, the location of the ½ infrared sub-pixel in the second pixel may be the same as that of the ½ red sub-pixel in the first pixel, or may be the same as that of the ½ green sub-pixel in the first pixel, or may be the same as that of the ½ blue sub-pixel in the first pixel. When a location of a ½ infrared sub-pixel in a second pixel is the same as that of the ½ red sub-pixel in the first pixel, a location of a ½ infrared sub-pixel in another second pixel is the same as that of the ½ green sub-pixel in the first pixel. When a location of a ½ infrared sub-pixel in a second pixel is the same as that of a ½ green sub-pixel in the first pixel, a location of a ½ infrared sub-pixel in another second pixel is the same as that of the ½ blue sub-pixel or the ½ red sub-pixel in the first pixel.

Correspondingly, in this case, in the pixel unit, a quantity of second pixels is 2, and a quantity of first pixels is greater than or equal to 0.

Figure 6A:
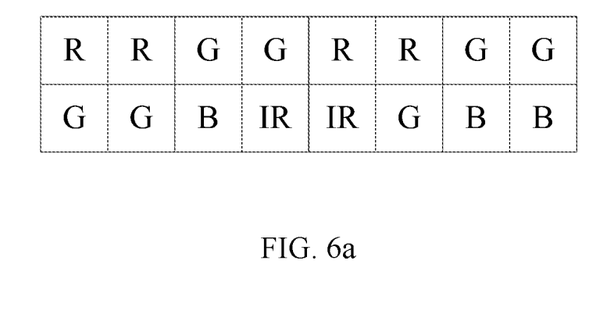
FIG. 6a is a schematic diagram 10 of a pixel unit according to some embodiments of this disclosure.

A quantity of pixels in the pixel unit is at least 2. In this case, the pixel unit includes two second pixels and zero or more first pixels. When a quantity of pixels in the pixel unit is 2, two second pixels are included. In this case, a pixel sampling density of infrared sub-pixels in the pixel unit is ⅛. For example, as shown in FIG. 6a, the pixel unit includes two second pixels. One second pixel includes one red sub-pixel, one green sub-pixel, one blue sub-pixel, a ½ green sub-pixel, and a ½ infrared sub-pixel, and the other second pixel includes one red sub-pixel, two green sub-pixels, a ½ blue sub-pixel, and a ½ infrared sub-pixel. In this case, a location of a ½ infrared sub-pixel in a second pixel is the same as that of a ½ green sub-pixel in the first pixel, and a location of a ½ infrared sub-pixel in the other second pixel is the same as that of a ½ blue sub-pixel in the first pixel. A proportion of the infrared sub-pixels in the pixel unit is ⅛, in other words, a pixel sampling density of the infrared sub-pixels is ⅛.

Figure 6B:
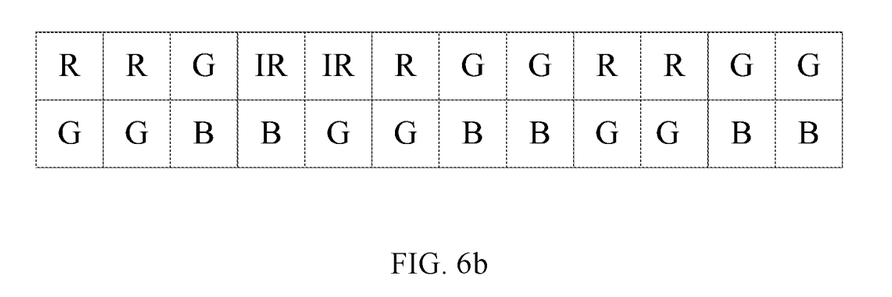
FIG. 6b is a schematic diagram 11 of a pixel unit according to some embodiments of this disclosure.

When a quantity of pixels in the pixel unit is 3, two second pixels and one first sub-pixel are included. In this case, a pixel sampling density of infrared sub-pixels in the pixel unit is 1/12. For example, as shown in FIG. 6b, the pixel unit includes two second pixels and one first pixel. One second pixel includes one red sub-pixel, one green sub-pixel, one blue sub-pixel, a ½ green sub-pixel, and a ½ infrared sub-pixel, and the other second pixel includes a ½ red sub-pixel, two green sub-pixels, one blue sub-pixel, and a ½ infrared sub-pixel. In this case, a location of a ½ infrared sub-pixel in one second pixel is the same as that of a ½ green sub-pixel in the first pixel, and a location of a ½ infrared sub-pixel in the other second pixel is the same as that of a ½ red sub-pixel in the first pixel. A proportion of the infrared sub-pixels in the pixel unit is 1/12, in other words, a pixel sampling density of the infrared sub-pixels is 1/12.

When a quantity of pixels in the pixel unit is 4, two second pixels and two first pixels are included. In this case, a pixel sampling density of infrared sub-pixels in the pixel unit is 1/16. For example, as shown in FIG. 4b, the pixel unit includes two second pixels and two first pixels. One second pixel includes one red sub-pixel, one green sub-pixel, one blue sub-pixel, a ½ green sub-pixel, and a ½ infrared sub-pixel, and the other second pixel includes one blue sub-pixel, two green sub-pixels, a ½ red sub-pixel, and a ½ infrared sub-pixel. In this case, a location of a ½ infrared sub-pixel in a second pixel is the same as that of a ½ green sub-pixel in the first pixel, and a location of a ½ infrared sub-pixel in the other second pixel is the same as that of a ½ red sub-pixel in the first pixel. A proportion of the infrared sub-pixels in the pixel unit is 1/16, in other words, a pixel sampling density of the infrared sub-pixels is 1/16.

The pixel array may include periodically arranged pixel unit arrays, where each pixel unit array is an RGB+IR pixel unit with a density of ⅛, an RGB+IR pixel unit with a density of 1/12, or an RGB+IR pixel unit with a density of 1/16. Certainly, the pixel array may be alternatively in another form. Examples are not listed herein.

The foregoing are only several corresponding pixel sampling implementations of infrared sub-pixels, and there may be further variations on this basis, or other pixel sampling manners may be used. In other words, pixel sampling manners of infrared sub-pixels are not further limited in some embodiments of this disclosure, and a plurality of corresponding implementations are not described herein. A pixel sampling location of an infrared sub-pixel in a pixel unit (a location of a second pixel) is not specifically limited in some embodiments of this disclosure. A density of infrared sub-pixels in a pixel unit is 1/n, n is an integer greater than or equal to 2, and a size of a pixel array applicable to the infrared sub-pixels is not limited.

In the foregoing form of the pixel unit, a red, green, or blue sub-pixel of a 2PD sub-pixel may be sampled as an infrared sub-pixel, to diversify the form of the pixel unit. Alternatively, a ½ red sub-pixel and a ½ green sub-pixels of a 2PD sub-pixel, or a ½ blue sub-pixel and a ½ green sub-pixel of a 2PD sub-pixel may be sampled as an infrared sub-pixel, to reduce impact of an IR defect pixel during RGB processing.

In some embodiments of this disclosure, the red sub-pixel includes a semiconductor layer, a metal layer, a photodiode, a red filter, and a micromirror that are stacked in sequence; the green sub-pixel includes a semiconductor layer, a metal layer, a photodiode, a green filter, and a micromirror that are stacked in sequence; the blue sub-pixel includes a semiconductor layer, a metal layer, a photodiode, a blue filter, and a micromirror that are stacked in sequence; and the infrared sub-pixel includes a semiconductor layer, a metal layer, a photodiode, an infrared filter, and a micromirror that are stacked in sequence.

Figure 7:
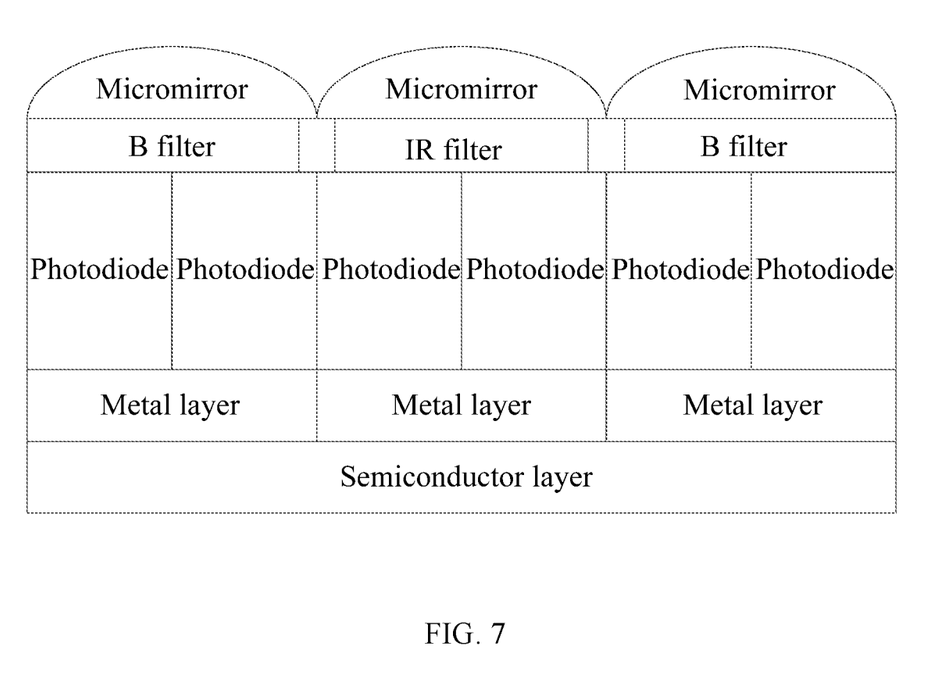
FIG. 7 is a sectional view of pixels according to some embodiments of this disclosure.

The semiconductor layer, the metal layer, the photodiode, the red filter, and the micromirror included in the red sub-pixel are arranged in sequence from bottom to top. Correspondingly, the semiconductor layer, the metal layer, the photodiode, the green filter, and the micromirror included in the green sub-pixel are arranged in sequence from bottom to top. The semiconductor layer, the metal layer, the photodiode, the blue filter, and the micromirror included in the blue sub-pixel are arranged in sequence from bottom to top. The semiconductor layer, the metal layer, the photodiode, the infrared filter, and the micromirror included in the infrared sub-pixel are arranged in sequence from bottom to top. The semiconductor layer herein may be a silicon substrate, but is not limited thereto. For structures of the red, green, blue, and infrared sub-pixels, refer to FIG. 7. Although FIG. 7 shows only the blue and infrared sub-pixels, structures of the red and green sub-pixels can be learned on this basis. A blue filter may be replaced with a red or green filter to obtain a structure of the red sub-pixel or the green sub-pixel.

The red, green, and blue sub-pixels are used to obtain color information of pixels of a composite image, and block infrared rays. For example, only visible light with a wavelength of 380 nm to 700 nm is allowed to pass, and a full-color and vivid image can be directly generated under high illumination. A photosensitive bandwidth of an infrared sub-pixel is 750 nm to 1100 nm, and an infrared filter region may be used to allow light within an infrared band to pass. This can improve a dark-state imaging effect and implement an infrared ranging function.

It can be learned from the foregoing descriptions that an RGB sub-pixel is a light-receiving element corresponding to light with a wavelength of each RGB color, and an IR sub-pixel is a light-receiving element corresponding to infrared light.

In some embodiments of this disclosure, the image sensor is a complementary metal oxide semiconductor CMOS image sensor, a charge-coupled device CCD image sensor, or a quantum thin-film image sensor.

A type of an image sensor to which the RGB-IR pixel array arrangement manner in this disclosure is applicable is not limited. The image sensor may be an image sensor based on a CMOS, an image sensor based on a charge-coupled device (CCD), or an image sensor based on a quantum thin film, or certainly may be another type of image sensor. In addition, the image sensor in some embodiments of this disclosure may be applicable to any electronic product including a camera module.

Figure 8A:
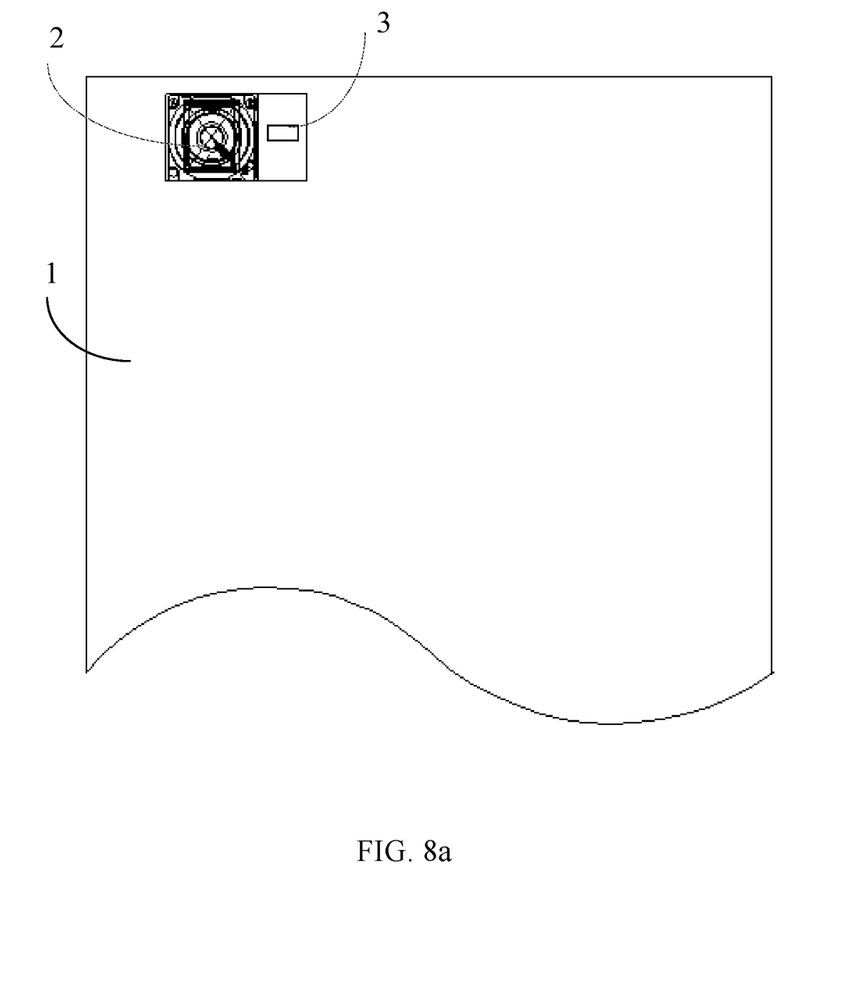
FIG. 8a is a schematic diagram of a mobile terminal according to some embodiments of this disclosure.
Figure 8B:
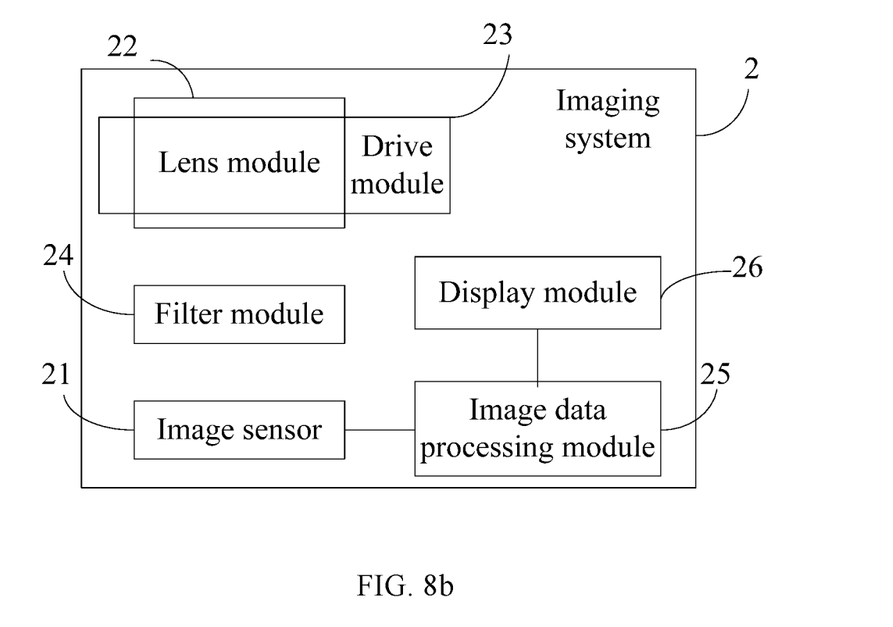
FIG. 8b is a schematic diagram of an imaging system according to some embodiments of this disclosure.

Some embodiments of this disclosure further provide a mobile terminal. As shown in FIG. 8a and FIG. 8b, the mobile terminal 1 includes an imaging system 2 and an infrared emission module 3. The imaging system 2 includes the foregoing image sensor 21, and further includes:

a lens module 22; a drive module 23 configured to drive the lens module 22 to move; a filter module 24 disposed between the lens module 22 and the image sensor 21; an image data processing module 25 connected to the image sensor 21; and a display module 26 connected to the image data processing module 25, where the infrared emission module 3 is disposed on a periphery of the lens module 22.

In some embodiments of this disclosure, the mobile terminal 1 includes the imaging system 2, and further includes the infrared emission module 3. The imaging system 2 includes the foregoing image sensor 21, and the imaging system 2 further includes the lens module 22 configured to focus light. The lens module 22 is connected to the drive module 23, and the drive module 23 is configured to adjust a location of the lens module 22 based on a distance of a to-be-photographed object.

The filter module 24 is disposed between the lens module 22 and the image sensor 21. After light is focused by the lens module 22 and passes through the filter module 24, the light may be focused on a pixel array of the image sensor 21. The image sensor 21 is connected to the image data processing module 25, and the image data processing module 25 is connected to the display module 26. After the light is focused on the pixel array of the image sensor 21, the image sensor 21 performs optical-to-electrical conversion and transmits data to the image data processing module 25. The image data processing module 25 processes the data, and displays processed data on the display module 26 in a form of a picture.

After the drive module 23 adjusts the location of the lens module 22, 2PD pixels in the image sensor 21 may be used to obtain a phase difference, so as to obtain a distance between the object and an imaging surface, and implement quick focus.

In addition, an RGB+IR pixel array arrangement manner based on a 2PD image sensor in this disclosure may cooperate with the infrared emission module 3 to implement three-dimensional related functions, for example, terminal applications such as facial recognition and unlocking, secure payment, and three-dimensional imaging, thereby improving a functionality of the mobile terminal on a basis of ensuring imaging.

In some embodiments of this disclosure, the filter module 24 may allow light with a wavelength of 380 nm to 1100 nm to pass. In this case, after the light is focused by the lens module 22, the light may be filtered by the filter module 24. The filter module 24 may be configured to allow natural light and infrared light to pass, to ensure an imaging effect of the imaging system 2.

The infrared emission module 3 in the mobile terminal is disposed on the periphery of the lens module 22. The infrared emission module 3 emits an infrared ray, and the infrared ray is reflected after encountering an obstacle. When capturing the reflected infrared ray, the imaging system 2 performs optical-to-electrical conversion by using infrared sub-pixels, to obtain a difference between a time when the infrared ray is emitted and a time when the infrared ray is received. Because a propagation speed of light is fixed, a distance between the obstacle and the mobile terminal can be calculated, and a distance between each tiny unit on the obstacle and the mobile terminal can be finally obtained, to implement a three-dimensional imaging and recording function. Certainly, a distance between each infrared light reflection point on the obstacle and the mobile terminal may also be obtained by obtaining a phase difference of infrared light.

In the mobile terminal in some embodiments of this disclosure, a pixel array arrangement manner of the image sensor is changed from an RGB pixel array arrangement manner to a 2PD RGB-IR pixel array arrangement manner, so that a distance between a to-be-photographed object and the mobile terminal can be detected on a basis of receiving infrared light and recording an image through photographing, to implement quick focus and background blurring, improve an imaging effect of an image, and implement related application functions of three-dimensional photographing and dark-state imaging, thereby ensuring diverse functions of the mobile terminal while ensuring photographing experience of a user.

Figure 9:
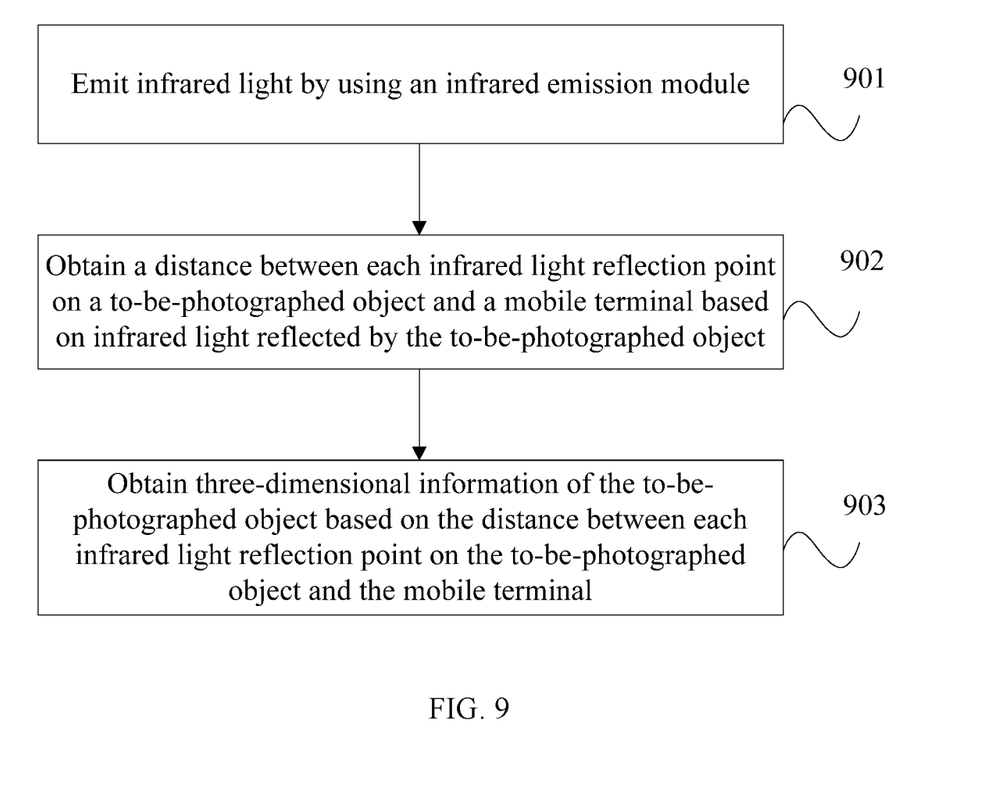
FIG. 9 is a schematic diagram of an image photographing method according to some embodiments of this disclosure.

Some embodiments of this disclosure further provide an image photographing method applied to a mobile terminal. The mobile terminal includes the foregoing image sensor, and further includes an infrared emission module. As shown in FIG. 9, the method includes the following steps.

Step 901: Emit infrared light by using the infrared emission module.

The infrared emission module in the mobile terminal may emit an infrared ray, and the infrared ray is reflected after encountering a to-be-photographed object. Reflected infrared light is received by an imaging system of the mobile terminal. The image sensor of the mobile terminal forms an RGB-IR pixel array, so that optical-to-electrical conversion can be performed by using infrared sub-pixels.

Step 902: Obtain a distance between each infrared light reflection point on a to-be-photographed object and the mobile terminal based on infrared light reflected by the to-be-photographed object.

When a distance between the to-be-photographed object and the mobile terminal is obtained, a distance between the to-be-photographed object and an imaging surface is actually obtained. A process of obtaining the distance between each infrared light reflection point on the to-be-photographed object and the mobile terminal is as follows: receiving, by using a pixel array including a second pixel, infrared light reflected by each infrared light reflection point on the to-be-photographed object; and obtaining the distance between each infrared light reflection point on the to-bephotographed object and the mobile terminal based on a difference between a time when the infrared light is sent and a time when the infrared light is received and a propagation speed of the infrared light, or by obtaining a phase difference of the infrared light. When a reflected infrared ray is captured, optical-to-electrical conversion is performed by using infrared sub-pixels, to obtain a difference between a time when the infrared ray is emitted and a time when the infrared ray is received. Because a propagation speed of light is fixed, a distance between an obstacle and the mobile terminal can be calculated based on ½ of a product of the time difference and the propagation speed. Times when the mobile terminal receives infrared light reflected by infrared light reflection points are different. Therefore, a distance may be calculated for each infrared light reflection point, and then the distance between each infrared light reflection point and the mobile terminal can be obtained. Alternatively, the distance between each infrared light reflection point and the mobile terminal may be obtained by obtaining the phase difference of the infrared light. For details, refer to a time of flight (TOF) technology. Details are not described herein.

In some embodiments of this disclosure, the pixel array of the image sensor includes a preset quantity of pixel units arranged in a preset manner. The pixel unit includes a first pixel and a second pixel. The first pixel includes a red sub-pixel, a green sub-pixel, and a blue sub-pixel. The second pixel includes at least one of a red sub-pixel or a blue sub-pixel, a green sub-pixel, and an infrared sub-pixel. The first pixel and the second pixel are both full-pixel dual-core focus pixels. The first pixel and the second pixel each include four full-pixel dual-core focus sub-pixels. A location of the infrared sub-pixel in the second pixel is the same as that of the red sub-pixel, the green sub-pixel, the blue sub-pixel, a first combined sub-pixel, or a second combined sub-pixel in the first pixel. The first combined sub-pixel is a combination of a ½ red sub-pixel and a ½ green sub-pixel whose locations are adjacent. The second combined sub-pixel is a combination of a ½ green sub-pixel and a ½ blue sub-pixel whose locations are adjacent. Alternatively, a location of a ½ infrared sub-pixel in the second pixel is the same as that of a ½ red sub-pixel, a ½ green sub-pixel, or a ½ blue sub-pixel in the first pixel, and ½ infrared sub-pixels in two adjacent second pixels are combined to form a complete infrared sub-pixel.

Step 903: Obtain three-dimensional information of the to-be-photographed object based on the distance between each infrared light reflection point on the to-be-photographed object and the mobile terminal.

When the distance between each infrared light reflection point on the to-be-photographed object and the mobile terminal is obtained, a distance between each tiny unit on the to-be-photographed object and the mobile terminal is specifically obtained, and then a procedure of photographing the to-be-photographed object is performed, to implement a three-dimensional imaging and recording function.

In the photographing method in some embodiments of this disclosure, a pixel array arrangement manner of the image sensor may be changed from an RGB pixel array arrangement manner to a 2PD RGB-IR pixel array arrangement manner, so that a distance between a to-be-photographed object and the mobile terminal can be detected on a basis of receiving infrared light and recording an image through photographing, to implement quick focus and background blurring, improve an imaging effect of an image, and implement related application functions of three-dimensional photographing and dark-state imaging, thereby ensuring diverse functions of the mobile terminal while ensuring photographing experience of a user.

Figure 10:
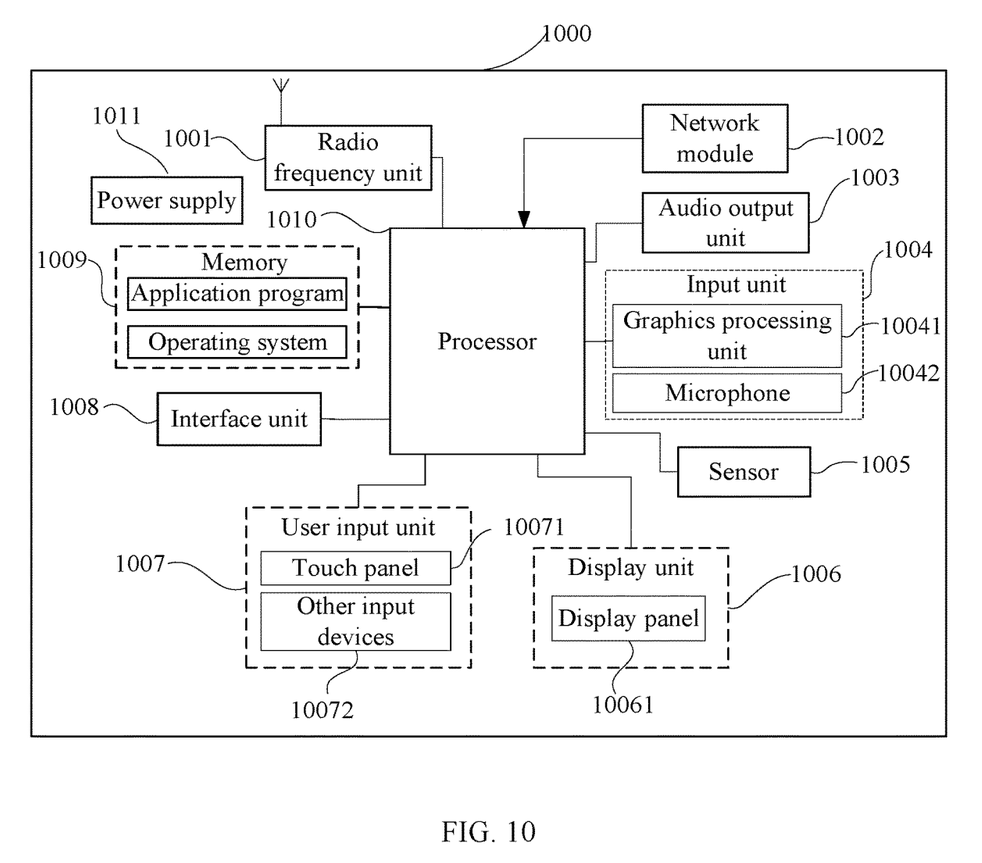
FIG. 10 is a schematic diagram of a hardware structure of a mobile terminal according to some embodiments of this disclosure.

FIG. 10 is a schematic diagram of a hardware structure of a mobile terminal implementing the embodiments of this disclosure. The mobile terminal 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, a processor 1010, and a power supply 1011.

The mobile terminal 1000 further includes an imaging system and an infrared emission module. The imaging system includes an imaging sensor; a lens module; a drive module configured to drive the lens module to move; a filter module disposed between the lens module and the image sensor; an image data processing module connected to the image sensor; and a display module connected to the image data processing module.

The filter module may allow light with a wavelength of 380 nm to 1100 nm to pass. The infrared emission module is disposed on a periphery of the lens module.

The image sensor includes:

a pixel array, where the pixel array includes a preset quantity of pixel units arranged in a preset manner, the pixel unit includes a first pixel and a second pixel whose location is adjacent to that of the first pixel, the first pixel includes a red sub-pixel, a green sub-pixel, and a blue sub-pixel, and the second pixel includes at least one of a red sub-pixel or a blue sub-pixel, a green sub-pixel, and an infrared sub-pixel, where the first pixel and the second pixel are both full-pixel dual-core focus pixels, and the first pixel and the second pixel each includes four full-pixel dual-core focus sub-pixels; and a location of the infrared sub-pixel in the second pixel is the same as that of the red sub-pixel, the green sub-pixel, the blue sub-pixel, a first combined sub-pixel, or a second combined sub-pixel in the first pixel, where the first combined sub-pixel is a combination of a ½ red sub-pixel and a ½ green sub-pixel whose locations are adjacent, and the second combined sub-pixel is a combination of a ½ green sub-pixel and a ½ blue sub-pixel whose locations are adjacent; or a location of a ½ infrared sub-pixel in the second pixel is the same as that of a ½ red sub-pixel, a ½ green sub-pixel, or a ½ blue sub-pixel in the first pixel, and ½ infrared sub-pixels in two adjacent second pixels are combined to form a complete infrared sub-pixel.

When the location of the infrared sub-pixel in the second pixel is the same as that of the red sub-pixel, the green sub-pixel, the blue sub-pixel, the first combined sub-pixel, or the second combined sub-pixel in first pixel, the pixel unit includes one second pixel and at least one first pixel.

When the location of the ½ infrared sub-pixel in the second pixel is the same as that of the ½ red sub-pixel, the ½ green sub-pixel, or the ½ blue sub-pixel in the first pixel, and the ½ infrared sub-pixels in the two adjacent second pixels are combined to form the complete infrared sub-pixel, in the pixel unit, a quantity of second pixels is 2, and a quantity of first pixels is greater than or equal to 0.

The red sub-pixel includes a semiconductor layer, a metal layer, a photodiode, a red filter, and a micromirror that are stacked in sequence. The green sub-pixel includes a semiconductor layer, a metal layer, a photodiode, a green filter, and a micromirror that are stacked in sequence. The blue sub-pixel includes a semiconductor layer, a metal layer, a photodiode, a blue filter, and a micromirror that are stacked in sequence. The infrared sub-pixel includes a semiconductor layer, a metal layer, a photodiode, an infrared filter, and a micromirror that are stacked in sequence.

The image sensor is a complementary metal oxide semiconductor CMOS image sensor, a charge-coupled device CCD image sensor, or a quantum thin-film image sensor.

A person skilled in the art may understand that the mobile terminal structure shown in FIG. 10 does not constitute a limitation on the mobile terminal. The mobile terminal may include more or fewer components than those shown in the figure, or some components may be combined, or there may be a different component layout. In some embodiments of this disclosure, the mobile terminal includes but is not limited to a mobile phone, a tablet computer, a laptop computer, a palmtop computer, an in-vehicle terminal, a wearable device, a pedometer, and the like.

The processor 1010 is configured to: emit infrared light by using the infrared emission module; obtain a distance between each infrared light reflection point on a to-be-photographed object and the mobile terminal based on infrared light reflected by the to-be-photographed object; and obtain three-dimensional information of the to-be-photographed object based on the distance between each infrared light reflection point on the to-be-photographed object and the mobile terminal.

In this way, a pixel array arrangement manner of the image sensor is changed from an RGB pixel array arrangement manner to a 2PD RGB-IR pixel array arrangement manner, so that a distance between a to-be-photographed object and the mobile terminal can be detected on a basis of receiving infrared light and recording an image through photographing, to implement quick focus and background blurring, improve an imaging effect of an image, and implement related application functions of three-dimensional photographing and dark-state imaging, thereby ensuring diverse functions of the mobile terminal while ensuring photographing experience of a user.

It should be understood that, in some embodiments of this disclosure, the radio frequency unit 1001 may be configured to send or receive a signal in an information sending/receiving or call process. Specifically, the radio frequency unit 1001 receives downlink data from a base station and sends the downlink data to the processor 1010 for processing; and sends uplink data to the base station. Generally, the radio frequency unit 1001 includes but is not limited to an antenna, at least one amplifier, a transceiver, a coupler, a low noise amplifier, a duplexer, and the like. In addition, the radio frequency unit 1001 may further communicate with a network and another device through a wireless communications system.

The mobile terminal provides a user with wireless broadband internet access through the network module 1002, for example, helping the user to send or receive an e-mail, to browse a web page, or to access streaming media.

The audio output unit 1003 may convert audio data received by the radio frequency unit 1001 or the network module 1002 or stored in the memory 1009 into an audio signal and output the audio signal as a sound. Furthermore, the audio output unit 1003 may also provide audio output (for example, a call signal received sound or a message received sound) related to a specific function performed by the mobile terminal 1000. The audio output unit 1003 includes a speaker, a buzzer, a telephone receiver, and the like.

The input unit 1004 is configured to receive an audio or video signal. The input unit 1004 may include a graphics processing unit (GPU) 10041 and a microphone 10042, and the graphics processing unit 10041 processes image data of a still picture or a video obtained by an image capture apparatus (for example, a camera) in an image capture mode or a video capture mode. A processed image frame may be displayed on the display unit 1006. The display unit herein is the foregoing display module. An image frame processed by the graphics processing unit 10041 may be stored in the memory 1009 (or another storage medium) or sent by the radio frequency unit 1001 or the network module 1002. The graphics processing unit 10041 is the foregoing image data processing module. The microphone 10042 can receive a sound and can process the sound into audio data. The processed audio data can be converted into a format that can be sent to a mobile communication base station through the radio frequency unit 1001 in a telephone call mode, for outputting.

The mobile terminal 1000 further includes at least one sensor 1005, for example, an optical sensor, a motion sensor, and other sensors. Specifically, the optical sensor includes an ambient light sensor and a proximity sensor, where the ambient light sensor can adjust luminance of a display panel 10061 based on brightness of ambient light, and the proximity sensor can turn off the display panel 10061 and/or backlight when the mobile terminal 1000 is moved to an ear. As a type of motion sensor, an accelerometer sensor can detect magnitudes of accelerations in all directions (usually three axes), can detect a magnitude and a direction of gravity when the mobile phone is in a static state, and can be applied to mobile phone posture recognition (such as screen switching between portrait and landscape, related games, and magnetometer posture calibration), functions related to vibration recognition (such as pedometer and tapping), and the like. The sensor 1005 may also include a fingerprint sensor, a pressure sensor, an iris sensor, a molecular sensor, a gyroscope, a barometer, a hygrometer, a thermometer, an infrared sensor, and the like. Details are not described herein.

The display unit 1006 is configured to display information input by the user or information provided for the user. The display unit 1006 may include the display panel 10061. The display panel 10061 may be configured in a form of a liquid crystal display (LCD), an organic light-emitting diode (OLED), or the like.

The user input unit 1007 may be configured to receive input digit or character information and generate key signal input related to user setting and function control of the mobile terminal. Specifically, the user input unit 1007 includes a touch panel 10071 and other input devices 10072. The touch panel 10071, also referred to as a touchscreen, may capture a touch operation performed by a user on or near the touch panel (for example, an operation performed by the user on the touch panel 10071 or near the touch panel 10071 by using any appropriate object or accessory such as a finger or a stylus). The touch panel 10071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 1010, and receives and executes a command sent by the processor 1010. In addition, the touch panel 10071 may be implemented in a plurality of forms, for example, as a resistive, capacitive, infrared, or surface acoustic wave touch panel. The user input unit 1007 may further include other input devices 10072 in addition to the touch panel 10071. Specifically, the other input devices 10072 may include but are not limited to a physical keyboard, a function key (such as a volume control key or a power on/off key), a trackball, a mouse, a joystick, and the like. Details are not described herein.

Further, the touch panel 10071 may cover the display panel 10061. After detecting a touch operation on or near the touch panel 10071, the touch panel 10071 transmits the touch operation to the processor 1010 to determine a type of a touch event. Then the processor 1010 provides corresponding visual output on the display panel 10061 based on the type of the touch event. Although in FIG. 10, the touch panel 10071 and the display panel 10061 act as two independent parts to implement input and output functions of the mobile terminal, in some embodiments, the touch panel 10071 and the display panel 10061 may be integrated to implement the input and output functions of the mobile terminal. This is not specifically limited herein.

The interface unit 1008 is an interface connecting an external apparatus to the mobile terminal 1000. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 1008 may be configured to: receive input (for example, data information and power) from the external apparatus, and transmit the received input to one or more elements in the mobile terminal 1000, or may be configured to transmit data between the mobile terminal 1000 and the external apparatus.

The memory 1009 may be configured to store a software program and various data. The memory 1009 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 1009 may include a high-speed random access memory, or may include a non-volatile memory, for example, at least one magnetic disk storage device, a flash memory device, or other volatile solid-state storage devices.

The processor 1010 is a control center of the mobile terminal, and is connected to all components of the mobile terminal by using various interfaces and lines. By running or executing a software program and/or module that is stored in the memory 1009 and calling data stored in the memory 1009, the processor 1010 executes various functions of the mobile terminal and processes data, so as to perform overall monitoring on the mobile terminal. The processor 1010 may include one or more processing units. Optionally, the processor 1010 may integrate an application processor and a modem processor. The application processor mainly processes an operating system, a user interface, an application program, and the like. The modem processor mainly processes wireless communication. It can be understood that the modem processor may be alternatively not integrated in the processor 1010.

The mobile terminal 1000 may further include the power supply 1011 (for example, a battery) supplying power to all components. Optionally, the power supply 1011 may be logically connected to the processor 1010 through a power management system. In this way, functions such as charge management, discharge management, and power consumption management are implemented by using the power management system.

In addition, the mobile terminal 1000 includes some functional modules that are not shown, details of which are not described herein.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, the former is a more preferred implementation. Based on such an understanding, the technical solutions of this disclosure essentially, or the part contributing to the related technology may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. An image sensor, comprising:
   a pixel array, wherein the pixel array comprises a preset quantity of pixel units arranged in a preset manner, the pixel unit comprises a first pixel and a second pixel whose location is adjacent to that of the first pixel, the first pixel comprises a red sub-pixel, a green sub-pixel, and a blue sub-pixel, and the second pixel comprises at least one of a red sub-pixel or a blue sub-pixel, a green sub-pixel, and an infrared sub-pixel, wherein the first pixel and the second pixel are both full-pixel dual-core focus pixels, and the first pixel and the second pixel each comprises four full-pixel dual-core focus sub-pixels; and
   when a location of a ½ infrared sub-pixel in the second pixel is the same as that of a ½ red sub-pixel, a ½ green sub-pixel, or a ½ blue sub-pixel in the first pixel, and ½ infrared sub-pixels in two adjacent second pixels are combined to form the complete infrared sub-pixel, in the pixel unit, a quantity of second pixels is 2, and a quantity of first pixels is greater than or equal to 0.

2. The image sensor according to claim 1, wherein
   the red sub-pixel comprises a semiconductor layer, a metal layer, a photodiode, a red filter, and a micromirror that are stacked in sequence;

the green sub-pixel comprises a semiconductor layer, a metal layer, a photodiode, a green filter, and a micromirror that are stacked in sequence;

the blue sub-pixel comprises a semiconductor layer, a metal layer, a photodiode, a blue filter, and a micromirror that are stacked in sequence; and the infrared sub-pixel comprises a semiconductor layer, a metal layer, a photodiode, an infrared filter, and a micromirror that are stacked in sequence.

3. The image sensor according to claim 1, wherein the image sensor is a complementary metal oxide semiconductor (CMOS) image sensor, a charge-coupled device (CCD) image sensor, or a quantum thin-film image sensor.

4. A mobile terminal, comprising an imaging system and an infrared emission module, wherein the imaging system comprises the image sensor according to claim 1, and further comprises:
 a lens module;
 a drive module configured to drive the lens module to move;
 a filter module disposed between the lens module and the image sensor;
 an image data processing module connected to the image sensor; and
 a display module connected to the image data processing module, wherein
 the infrared emission module is disposed on a periphery of the lens module.

5. The mobile terminal according to claim 4, wherein the filter module is capable of allowing light with a wavelength of 380 nm to 1100 nm to pass.

6. An image photographing method applied to a mobile terminal, wherein the mobile terminal comprises the image sensor according to claim 1, and further comprises an infrared emission module, and the method comprises:
 emitting infrared light by using the infrared emission module;
 obtaining a distance between each infrared light reflection point on a to-be-photographed object and the mobile terminal based on infrared light reflected by the to-be-photographed object; and
 obtaining three-dimensional information of the to-be-photographed object based on the distance between each infrared light reflection point on the to-be-photographed object and the mobile terminal.

7. A mobile terminal, comprising a memory, a processor, and a computer program stored in the memory and capable of running on the processor, wherein when the computer program is executed by the processor, the steps of the image photographing method according to claim 6 are implemented.

8. A non-transitory computer-readable storage medium storing a computer program thereon, wherein when the computer program is executed by a processor, the steps of the image photographing method according to claim 6 are implemented.

9. A mobile terminal, comprising an imaging system and an infrared emission module, wherein the imaging system comprises the image sensor according to claim 2, and further comprises:
 a lens module;
 a drive module configured to drive the lens module to move;
 a filter module disposed between the lens module and the image sensor;
 an image data processing module connected to the image sensor; and
 a display module connected to the image data processing module, wherein
 the infrared emission module is disposed on a periphery of the lens module.

10. A mobile terminal, comprising an imaging system and an infrared emission module, wherein the imaging system comprises the image sensor according to claim 3, and further comprises:
 a lens module;
 a drive module configured to drive the lens module to move;
 a filter module disposed between the lens module and the image sensor;
 an image data processing module connected to the image sensor; and
 a display module connected to the image data processing module, wherein
 the infrared emission module is disposed on a periphery of the lens module.

* * * * *